July 29, 1930.　　　F. W. BREHM　　　1,771,483
PHOTOGRAPHIC ROLL HOLDER
Filed Sept. 26, 1923
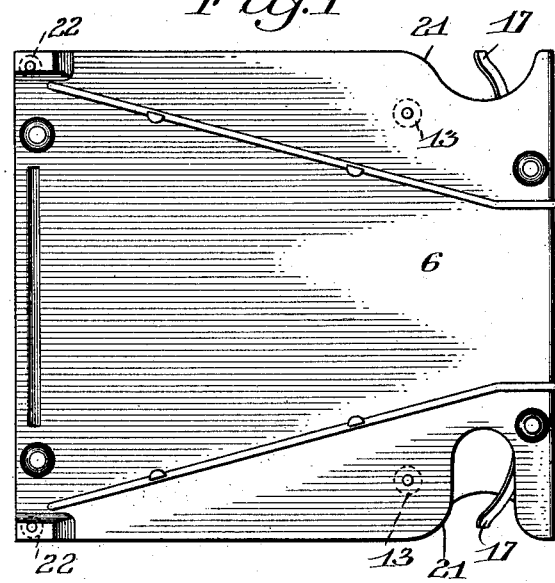
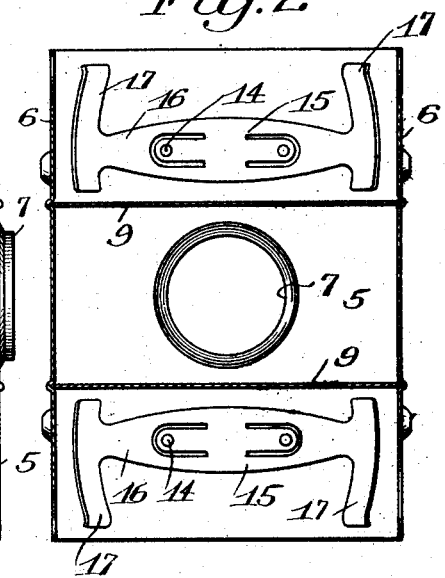
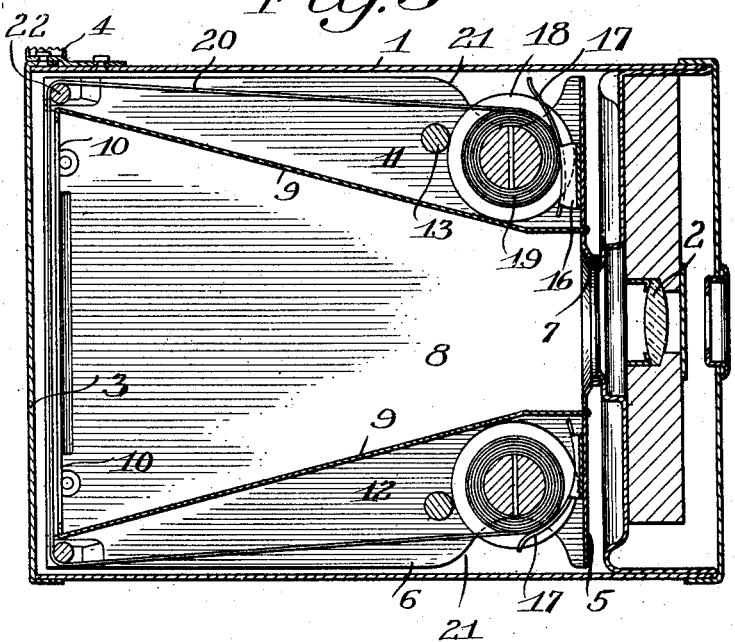
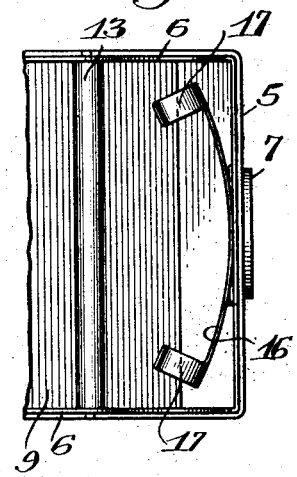
INVENTOR.
Frederick W. Brehm
BY
his ATTORNEY Patented July 29, 1930

1,771,483

UNITED STATES PATENT OFFICE

FREDERICK W. BREHM, OF ROCHESTER, NEW YORK, ASSIGNOR TO EASTMAN KODAK COMPANY, OF ROCHESTER, NEW YORK, A CORPORATION OF NEW YORK

PHOTOGRAPHIC ROLL HOLDER

Application filed September 26, 1923. Serial No. 664,971.

My present invention relates to photography and more particularly to photographic cameras of the box type and it has for its object to provide a simple, cheap and convenient roll holder for cameras of this character in which the film spools may be inserted or removed with ease and certainty by unskilled persons but which will insure accurate and positive behavior of the spools and of the film in the feeding of the latter during the ordinary manipulation of the camera. To these and other ends the invention resides in certain improvements and combinations of parts all as will be hereinafter more fully described, the novel features being pointed out in the claims at the end of the specification.

In the drawings:

Figure 1 is a side view of a roll holder constructed in accordance with and illustrating one embodiment of my invention detached from the camera.

Figure 2 is a front view thereof.

Figure 3 is a longitudinal central sectional view in the axis of the lens showing the roll holder in position in the camera body or containing shell, and Figure 4 is a fragmentary top view of one of the roll holder chambers.

Similar reference numerals throughout the several views indicate the same parts.

A box camera of the type to which my improvements are particularly applicable comprises an outer shell or body carrying a lens at the front and a back closure at the rear. The roll holder structure fits within the camera being insertable and removable through the back and provides the exposure chamber, film chambers at each side thereof and an exposure opening at the rear.

Referring more particularly to the drawings 1 indicates the shell or body of the camera carrying a lens 2 at the front and closed by a door 3 at the back fastened with a suitable catch 4. In these respects the camera possesses the characteristics of the ordinary box camera. The roll holder structure embodies a yoke shaped metal plate having a connecting portion 5 at the front and two side walls 6 extending rearwardly in parallelism therefrom. The connecting portion 5 is provided with an opening having a surrounding collar 7 aligned with the lens 2 and cooperating with the mount thereof in such manner as to exclude light passing through the lens from all but the exposure chamber 8. The latter is composed between the side walls 6 and upper and lower walls 9 extending between the side walls 6 and converging toward the lens opening collar 7. These walls 9 are parts of a yoke shaped plate the connecting portion of which is at the rear of the body and has an opening 10 forming the exposure opening of the camera across which the film is drawn in the focal plane.

The converging walls 9 produce at the front of the roll holder between the upper and lower portions of the side walls 6 film chambers 11 and 12. When the roll holder is detached, these chambers are open on one side but when the roll holder is in place in the camera, a wall of the camera body closes this open side as shown in Figure 3. Each chamber is provided at a suitable distance from the front wall 5 with a transverse roller 13. Secured to the said front wall at 14 is a spring plate 15 having resilient arms 16 constituting leaf springs terminating in arcuate transverse heads 17.

The film spool 18 carrying the film roll 19 is inserted between the front wall 5 and the roller 13, it of course being understood that one of the rolls is the feed roll that initially carries the unexposed film while the other spool is a winding roll on which the exposed film is taken up after it has passed the exposure opening 10. When so inserted, the spool is confined between the front wall 5 and the roller 13 which latter is located above its axis so that as the film 20 is drawn therefrom it does not ordinarily create a tendency on the part of the spool to ride over the roller but merely to bear against the same and turn it. At the same time the proximity of the wall of the camera body 1 would prevent the spool from riding over the roller 13 in any event.

The side walls 6 in the neighborhood of each film chamber are cut away at 21 to give freedom to the fingers of the operator in inserting or removing the spool while grasped by its ends. As the spool is inserted in this way the heads 17 on the spring arm 16 are depressed or thrust back by engagement with the roll and after the spool is in place they bear upon the roll and not only hold it in proper relationship against the roller 13 because of their curvature resulting in a downward pressure but create a tension by their frictional engagement with the film roll that prevents it from over winding particularly when the camera is being loaded and the lead end of the paper backing is being threaded through the winding spool.

The film is drawn as usual over guide rolls 22 tangent to the focal plane and as each spool turns during the winding process it has a three point contact one of which is against the chamber wall 9 and the other two of which are above the axis at the roller 13 and the spring head 17 thereby effectually confining the spool to a definite rotative position.

It is almost unnecessary to say that the roll holder is filled while withdrawn from the camera body and is reinserted therein after the lead end of the film has been threaded into the winding roll.

I claim as my invention:

1. In a photographic roll holder, the combination with a dark chamber having forwardly converging walls forming triangular film chambers on opposite sides of the dark chamber, of rollers spanning the chambers and film spools arranged in the latter and confined between the front walls thereof and the rollers, the end walls of the film chambers being cut away to permit the end flanges of the spools to be grasped by the operator the rollers being arranged outwardly of the centers of the spools with reference to the axis of the camera.

2. In a roll film camera, a casing, a removable roll holding structure therein removable bodily rearwardly therefrom comprising side walls connected by a front wall and by converging top and bottom walls having their front ends engaging said front wall inwardly of its top and bottom edges, the walls of said roll holding structure forming oppositely disposed cartridge receiving pockets, anti-friction supports within said pockets for engaging cartridges placed therein and separate resilient members disposed in said pockets rearwardly of said front wall and adapted for urging the cartridges in engagement with said anti-friction supports.

3. In a roll film camera, a casing, a removable roll holding structure therein removable bodily rearwardly therefrom comprising side walls connected by a front wall and by converging top and bottom walls having their front ends engaging said front wall inwardly of its top and bottom edges, the walls of said roll holding structure forming oppositely disposed chambers, rollers spanning said chambers, film spools disposed within the chambers in engagement with the end portions of the rollers and springs disposed upon the end wall outwardly of the front ends of said converging walls and adapted to yieldingly engage the film.

4. In a photographic roll holder, the combination with a film chamber having bottom, front and side walls, of a resilient device carried by the front wall, an opposed roll spanning the chamber between the side walls, the positions of the resilient device and the roll being such as to compress the resilient device when a film roll resting on the bottom of the chamber is drawn outwardly between them during removal.

5. In a photographic roll holder, the combination of a film chamber having bottom, front and side walls, a flanged spool spanning the chamber between the side walls and having a film wound thereon, means carried by the side walls in spaced relation to the bottom wall and in rear of the spool in position to engage the flanges of the latter, and a device secured to the rear of the front wall and having spaced end portions yieldably engaging the film adjacent the ends of the spool and serving to hold the flanges of the latter in engagement with said means.

6. In a photographic roll holder, the combination of a film chamber having side and bottom walls, a flanged spool spanning the chamber between the side walls with the flanges in engagement with the bottom wall, means spaced from the bottom wall in rear of the spool arranged to engage the flanges thereof and resilient means including spaced parts engaging the film adjacent the opposite ends of the spool whereby to separately urge the flanges into engagement with said means.

7. In a photographic roll holder, the combination of a film chamber having bottom, front and side walls, a roll disposed within the chamber, supporting means in rear of the roll for resisting movement thereof transversely of its axis and resilient means for urging the roll in engagement with said means comprising a spring carried by the front wall and extending longitudinally of the roll and having spaced end portions engaging the opposite ends of the roll whereby to separately urge said ends into engagement with said supporting means.

8. In a photographic roll holder, the combination with a dark chamber having forwardly converging walls forming triangular film chambers on opposite sides of the dark chamber, feeding and winding film spools disposed within said triangular chambers at the front ends thereof, said spools having flanges at their opposite ends, supporting means for the film at the rear end of the dark chamber for guiding the film in the focal plane of the camera and rollers in said triangular chambers engaging the flanges of the spools at points outwardly of the axes of the spools with reference to the optical axis of the camera whereby the spools are held against outward displacement by the pull of the film when advanced into the focal plane by the winding of the winding spool.

FREDERICK W. BREHM.